3,826,779
ANTIOXIDANTS
Brian Thomas Ashworth, Kenneth Crawford, and Peter Michael Quan, Manchester, England, assignors to Imperial Chemical Industries Limited, London, England
No Drawing. Filed Feb. 18, 1972, Ser. No. 227,652
Int. Cl. C08g 45/60, 51/60
U.S. Cl. 260—45.9 R                                6 Claims

ABSTRACT OF THE DISCLOSURE

Acyl derivatives of p-nitrosophenols, p-nitrosoanilines and p-nitrosophenylhydroxylamines are antioxidants for rubber which are resistant to extraction by solvents. The acyl derivatives are preferably prepared by acylation at 10–40° C. in a water-miscible solvent, best in admixture, in presence of a weakly basic acid binding agent.

---

This invention relates to the stabilisation of rubbers against oxidation by the use of acyl derivatives of certain aromatic nitroso compounds.

p-Nitrosoanilines are of value as antioxidants for rubbers, especially since they are resistant to extraction from the rubber by solvents. The acyl derivatives used in the present invention have advantages over nitroso anilines in that they are less prone to stain and irritate the skin, they disperse more easily in the rubber and have less effect on the processing safety of the rubber.

According to the invention there are provided stabilised rubber compositions containing in stabilising amount an acyl compound which is an acyl derivative of a nitroso compound of the formula

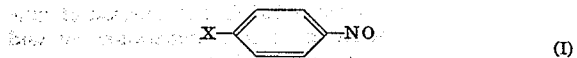    (I)

wherein X is a hydroxyl group or a group of the formula NHR or N(OH)R in which R is an alkyl, alkenyl, cycloalkyl or aryl group or substituted derivative thereof and wherein the benzene ring may optionally be further substituted.

The rubber may be natural rubber or a synthetic rubber for example a polymer or copolymer derived from a conjugated diene such as cis-polybutadiene, cis-polyisoprene, other polymers of butadiene or isoprene, polymers of 2-chlorobutadiene or copolymers of any of the foregoing with each other or with isobutene, styrene, acrylonitrile, methyl methacrylate, or other well-known polymerisable compounds used in the manufacture of synthetic rubbers.

The acyl compound may be incorporated into the rubber by any conventional method. For example it may be mixed on a mill with the unvulcanised rubber alone or with other compounds used in rubber technology such as vulcanising agents, sulphur, vulcanising accelerators, retarders, antiozonants, other antioxidants, blowing agents, pigments, fillers and waxes. The acyl compounds are of particular value for the stabilisation of vulcanised rubber compositions.

The amount of acyl compound to be used is conveniently from 0.1 to 4.0%, and preferably from 0.25 to 2.0%, of the weight of rubber. Larger or smaller amounts can however be used if desired.

The acyl compounds are derived from the quinone oxime or quinone imine oxime tautomers of the nitroso compounds and have compositions of the formulae

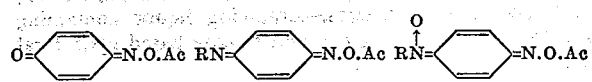

wherein R has the meaning given hereinbefore and Ac is an acyl group.

As examples of groups which may be represented by R there are mentioned alkyl groups such as methyl, ethyl, isopropyl and n-octyl, alkenyl groups such as oleyl, cycloalkyl groups such as cyclohexyl, aryl groups such as phenyl, p-tolyl and α-naphthyl, and substituted derivatives of the foregoing such as β-hydroxyethyl, p-hydroxyphenyl and p-chlorophenyl.

The preferred acyl compounds are those derived from nitroso compounds in which X is an alkylamino group, particularly a methylamino or ethylamino group, or an arylamino group, particularly an anilino group.

The acyl group may be derived from an aliphatic, unsaturated aliphatic, cycloaliphatic, aromatic or heterocyclic mono or polycarboxylic acid or substituted derivative thereof. As examples of such acids there are mentioned formic, acetic, lauric, behenic, isobutyric, 3-chloropropionic, 1-naphthylacetic, phenoxyacetic, acrylic, oleic, carbonic, alkyl hydrogen carbonic such as ethyl hydrogen carbonic, adipic, azelaic, sebacic, itaconic, cyclobutanoic, cyclohexanoic, cyclodecanoic, naphthenic, cyclohexane-1,4-dicarboxylic, benzoic, o-, n-, and p-nitrobenzoic, p-toluic, p-chlorobenzoic, 1-naphthoic, terephthalic, isophthalic, nicotinic, furoic and quinaldic acids.

In those cases wherein the acyl group is derived from a polycarboxylic acid one or more than one of the carboxylic acid groups may take part in the formation of the acyl compound.

The preferred carboxylic acids from which the acyl groups may be derived are alkane carboxylic acids containing a total of four to eighteen carbon atoms, especially lauric and stearic acids, carbonic acid, alkyl e.g. ethyl hydrogen carbonic acid, α,ω-alkanedioic acids containing from six to twelve carbon atoms, especially adipic, azelaic and sebacic acids, and aryl carboxylic acids for example benzoic acid and readily available substituted derivatives thereof such as alkyl, alkoxy or chloro substituted benzoic acids.

The acyl group may alternatively be a 1,3,5-triazinyl group or other heterocyclic group chloro derivatives of which have acylating actions similar to those of acyl chlorides. As examples of such chloroheterocyclic compounds there are mentioned cyanuric chloride, 2,4,5,6-tetrachloropyrimidine and phosphonitrile chlorides. In those cases wherein the chloroheterocyclic compounds contain two or more reactive chlorine atoms one or more of the reactive chlorine atoms may be reacted with the nitroso compound and, if desired, any remaining reactive chlorine atoms may be replaced in conventional manner by reaction with for example amines, alcohols or phenols.

The acyl group may also be a carbamyl group of the formula R¹R² N.CO wherein R¹ and R² are each groups of the type represented by R, especially alkyl groups such as methyl or ethyl or aryl groups such as phenyl.

The acyl group may in addition be derived from an oxyacid of sulphur, phosphorus, silicon or boron. As examples of such acyl groups there are mentioned isopropylsulphenyl, benzenesulphenyl, methanesulphonyl, p-toluenesulphonyl, phosphoryl, boryl, silicyl, $(RO)_2O.P$—, $Cl_2Si<$, and

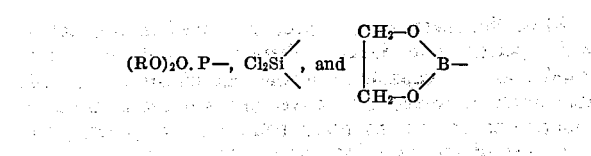

As optional further substituents in the benzene ring of the acyl compound there are mentioned alkyl groups such as methyl, ethyl, isopropyl, n-butyl, isobutyl, tert.-butyl, α-methylcyclohexyl, substituted alkyl groups such as benzyl, and aromatic groups such as phenyl. In those cases wherein X is an NHR or N(OH)R group it is preferred that the benzene ring should not be further substituted. When X is an OH group the preferred substituents are alkyl groups, especially 2-isopropyl-5-methyl, 2,5-dimethyl and 3-pentadecyl.

The acyl compounds may be prepared by treating the appropriate nitroso compound of Formula I with preferably an acid chloride but other conventional reactive derivatives of an acid which will give rise to an acyl group, for example an acid anhydride may be used. The reaction is desirably carried out in presence of an acid binding agent, preferably a weakly basic metal compound such as calcium carbonate, calcium hydroxide, sodium bicarbonate and especially sodium carbonate. Other acid binding means can be used, for example caustic alkalis or organic tertiary amines, or the nitroso compounds can be used as preformed metal salts but the former afford less pure products and the latter procedure is inconvenient.

The reaction is desirably carried out in a solvent which may be water or a water-insoluble organic solvent such as toluene or ethyl acetate. The preferred solvents however are water-miscible solvents such as lower aliphatic alcohols such as methanol and especially ethanol, and ketones such as acetone, best results being obtained when these solvents are used in admixture with water, the solvent-water ratio being between about 50:50 and 90:10 by weight. The preferred temperature range using these solvents is from 10 to 40° C.

An additional advantage obtained by use of the preferred process conditions is that the resulting product has greater thermal stability and is more easy to disperse in rubber. For example the benzoyl derivative of 4-nitrosodiphenylamine so prepared is an orange-coloured solid which is essentially stable up to near the melting point of 154–156° C., but when prepared under different conditions the product, which is somewhat greener in shade, may be difficult to disperse in rubber and may commence to decompose exothermically at up to 40° C. lower.

The product is frequently insoluble in the reaction medium and can be isolated by filtration and washing with water to remove any inorganic salts. If, however, it remains in solution it may be isolated by removal of the solvents by distillation or in suitable cases by precipitation by the addition of water.

The invention is illustrated but not limited by the following Examples in which all parts and percentages are by weight unless otherwise stated.

EXAMPLE 1

10 Parts of 4-nitrosodiphenylamine are dissolved in 125 parts of acetone, and 12.5 parts of anhydrous sodium carbonate are added. The mixture is mechanically stirred, and 5.1 parts of acetic anhydride are added. After a reaction period of 17 hours the mixture is filtered and the filter cake is washed with 100 parts of acetone. The filtrate and washings are poured into 600 parts of water when 11 parts of the required acetyl compound are precipitated. The precipitate is collected and after drying at 50° under reduced pressure it melts at 87–88° C.

Calculated for $C_{12}H_9N_2O.C_2H_3O$: Carbon, 70.0%, Hydrogen, 5.0% and Nitrogen, 11.7%. Found: Carbon, 70.8%, Hydrogen, 5.1%, and Nitrogen, 11.7%.

EXAMPLE 2

The procedure of Example 1 is repeated using 10 parts of p-toluenesulphonyl chloride in place of the acetic anhydride. There are thus obtained 14.6 parts of the required acyl compound melting at 130–132° C.

Calculated for $C_{12}H_9N_2O.C_7H_7SO_2$: Carbon, 64.8%, Hydrogen, 4.54%, Nitrogen, 7.95% and Sulphur, 9.1%. Found: Carbon, 65.5%, Hydrogen, 4.4%, Nitrogen, 7.6% and Sulphur, 8.5%.

EXAMPLE 3

10 Parts of 4-nitrosodiphenylamine are dissolved in 100 parts of acetone, and 15 parts of anhydrous sodium carbonate and 6.8 parts of N,N'-dimethylcarbamyl chloride are added. The mixture is stirred and heated under reflux for 30 hours and then filtered. The filter cake is washed with acetone and the filtrate and washings are combined, diluted with water, and warmed under reduced pressure until most of the acetone is evolved and the product precipitates. 6.0 Parts of acyl compound melting at 158–160° C., with decomposition, are obtained.

Calculated for $C_{12}H_9N_2O.C_3H_6NO$: Carbon, 66.9%, Hydrogen, 5.6% and Nitrogen, 15.6%. Found: Carbon, 66.9%, Hydrogen, 5.5% and Nitrogen, 15.9%.

EXAMPLE 4

The procedure of Example 1 is repeated, but using 11.6 parts of N,N'-diphenylcarbamyl chloride as the acylating agent. 8.1 Parts of acyl compound melting at 154–156° C. with decomposition are obtained.

Calculated for $C_{12}H_9N_2O.C_{13}H_{10}NO$: Carbon, 76.3%, Hydrogen, 4.9% and Nitrogen, 10.7%. Found: Carbon, 76.4%, Hydrogen, 4.9% and Nitrogen, 10.6%.

EXAMPLE 5

The procedure of Example 1 is repeated but using 6.2 parts of ethyl chloroformate as the acylating agent and allowing only 1 hour for the reaction period. 5.3 Parts of acyl compound melting at 84–86° C. are obtained.

Calculated for $C_{12}H_9N_2O.C_3H_5O_2$, Carbon, 66.7%, Hydrogen, 5.2%, and Nitrogen, 10.35%. Found: Carbon, 67.0%, Hydrogen, 5.0% and Nitrogen, 10.5%.

EXAMPLE 6

10 Parts of p-nitrosodiphenylamine are dissolved in 150 parts of acetone and 15 parts of anhydrous sodium carbonate are added. The mixture is stirred and cooled to 0°, and a solution of 15 parts of stearoyl chloride in 50 parts of acetone is added dropwise. The mixture is allowed to reach room temperature and stirring is continued for a further hour. The solution is then filtered, and the filter cake is washed with 1000 parts of acetone. Filtrate and washings are combined and diluted with water when 18.6 parts of the acyl compound are precipitated. When dry the melting point is 78–80° C. with decomposition.

Calculated for $C_{12}H_9N_2O \cdot C_{18}H_{35}O$: Carbon, 77.5%, Hydrogen, 9.6% and Nitrogen, 6.0%. Found: Carbon, 78.0%, Hydrogen, 9.6% and Nitrogen, 5.5%.

EXAMPLE 7

10 Parts of 4-nitrosodiphenylamine are dissolved in 100 parts of acetone. 10 Parts of anhydrous sodium carbonate are added, and the mixture is stirred while a solution of 7.3 parts of adipyl chloride in 30 parts of acetone is added. Stirring is continued for 2 hours, and the mixture is then filtered. The filter cake is washed with water to dissolve inorganic salts, and dried, yielding 9.2 parts of acyl compound melting at 159–160° C. with decomposition.

Calculated for $(C_{12}H_9N_2O)_2C_6H_8O_2$: Carbon, 71.1%, Hydrogen, 5.2% and Nitrogen, 11.0%. Found: Carbon, 70.7%, Hydrogen, 5.5% and Nitrogen, 10.8%.

EXAMPLE 8

The procedure of Example 7 is repeated, but using 7.1 parts of sebacoyl chloride as the acylating agent. 8.9 Parts of acyl compound melting at 136–137° C. are obtained.

Calculated for $(C_{12}H_9N_2O)_2C_{10}H_{16}O_2$: Carbon, 72.7%, Hydrogen, 6.1% and Nitrogen, 10.0%. Found: Carbon, 72.6%, Hydrogen, 6.0% and Nitrogen, 9.9%.

EXAMPLE 9

The procedure of Example 7 is repeated using 4.6 parts of cyanuric chloride as the acylating agent. 8.6 Parts of the required acyl compound are obtained.

Calculated for $(C_{12}H_9N_2O)_2 \cdot C_3N_3Cl$: Carbon, 63.9%, Hydrogen, 3.6% and Chlorine, 6.9%. Found: Carbon, 63.8%, Hydrogen, 3.8% and Chlorine, 6.3%.

EXAMPLE 10

Rubber mixes of the following composition are prepared by mixing on a two roll mill:

| | |
|---|---|
| Pale Crepe Natural Rubber | 100 |
| Zinc oxide | 10 |
| Stearic acid | 1 |
| Barium sulphate | 75 |
| Sulphur | 2.5 |
| Cyclohexylbenzthiazyl sulphenamide | 0.5 |
| Antioxidant | As indicated |

The mixes are vulcanised for 20 minutes at 153° C. and the vulcanisates, in sheet form of 0.8 mm. thickness, are examined for antioxidant activity by determining the time taken in hours for an absorption of 2% of their weight of oxygen at 100° C. Mooney Scorch times at 130° C. are measured on the unvulcanised compound using a Mooney Viscometer. The time in minutes ($t_{10}$) required for the Mooney reading to rise ten units above the minimum viscosity is recorded. The colour and strength of stain produced by the rubbers in contact with plasticised polyvinyl chloride for 24 hours is assessed visually. Comparable tests are carried out with similar compounds containing no antioxidant. The results below show that the antioxidants of the invention have a greater processing safety and stain less compared with 4-nitrosodiphenylamine and also retain a high proportion of their antioxidant effect after solvent extraction of the vulcanisate.

EXAMPLE 11

Rubber mixes of the following composition are prepared on a two roll mill:

| | |
|---|---|
| Smoked sheet Natural Rubber | 100 |
| Zinc oxide | 3.5 |
| Stearic acid | 3 |
| High abrasion furnace black | 45 |
| Aromatic process oil | 3.5 |
| Sulphur | 2.5 |
| Cyclohexylbenzthiazyl sulphenamide | 0.5 |
| Antioxidant | 0 or 2 |

The mixes are vulcanised for 20 minutes at 153° C. and the vulcanisates, in sheet form of 0.8 mm. thickness, are examined for antioxidant activity as for Example 10. The results below show the antioxidants of the invention to lose little of their antioxidant effect after extraction and in certain instances the antioxidant effect is actually improved.

| Antioxidant | None | Benzoyl derivative of 4-nitrosodiphenylamine | Acetyl derivative of 4-nitrosodiphenylamine | Product of example 2 | Benzene sulphonyl derivative of 4-nitrosodiphenylamine | 4-nitrosodiphenylamine |
|---|---|---|---|---|---|---|
| Percent on rubber hydrocarbon | | 2 | 2 | 2 | 2 | 2 |
| Time (in hours) for absorption of 2% oxygen: | | | | | | |
| Unextracted vulcanisate | 11 | 23 | 28 | 17 | 17 | 30 |
| Extracted vulcanisate* | <8 | 29 | 29 | 15 | 15 | 44 |

*Extracted as described in Example 10.

NOTE.—The benzene sulphonyl derivative of p-nitrosodiphenylamine is prepared by a procedure similar to that described in Example 2.

EXAMPLE 12

10 parts of 4-nitrosodiphenylamine are dissolved in 100 parts of acetone and 15 parts of anhydrous sodium carbonate are added. The mixture is cooled to 0° and stirred. A stream of nitrogen gas containing 5 parts of phosgene is then bubbled slowly through the mixture. Stirring is continued for half an hour after addition is complete. 8.8 parts of the acyl derivative are precipitated. The precipitate is collected and washed with water. After drying it melts at 115–118°.

Calculated for $(C_{12}H_9N_2O)_2CO$: Carbon, 71%, and Hydrogen, 4.3%. Found: Carbon, 70.6%, and Hydrogen 3.9%.

EXAMPLE 13

30 parts of 2,5-dimethyl-4-nitrosophenol are dissolved in 200 parts of acetone and 25 parts of sodium carbonate are added. The mixture is stirred and cooled to 0°, and a

| Antioxidant | None | O-acetyl-p-benzoquinone monoxime | Product of Example 6 | Product of Example 8 | Product of Example 7 | Terephthalic acid diester of p-nitrosodiphenylamine | Isophthalic acid diester of p-nitrosodiphenylamine | 4-nitrosodiphenylamine |
|---|---|---|---|---|---|---|---|---|
| Percent on rubber hydrocarbon | | 2 | 2 | 2 | 2 | 2 | 2 | 2. |
| Mooney scorching at 130° C.: | | | | | | | | |
| $t_{10}$ (minutes) | 23 | | 13 | 8 | 9 | 17 | 11 | 6. |
| Time (in hours) for absorption of 2% oxygen: | | | | | | | | |
| Unextracted vulcanisate | 21 | 32 | 48 | 44 | 52 | 41 | 41 | 52. |
| Extracted vulcanisate* | Less than 8. | 25 | 41 | 60 | 61 | 26 | 36 | >40. |
| Contact stain to plasticised PBC | None | Light fawn. | Light reddish yellow. | Light greenish yellow. | Light greenish yellow. | Light brownish yellow. | Light greenish yellow. | Intense yellowish brown. |

*After 24 hours continuous extraction in a Soxhlet apparatus with a mixture of 110 parts by volume of acetone, 42 parts by volume of methanol, and 60 parts by volume of 1,1,1-trichloroethane.

The terephthalic and isophthalic acid diesters of p-nitroso diphenylamine used above are prepared by a procedure similar to that described in Example 7.

solution comprising 30 parts of benzoyl chloride and 40 parts of acetone is added dropwise. The mixture is allowed to reach room temperature and stirring is continued for a further hour. 150 parts of water are added and the acyl derivative is precipitated. It is collected and after being washed with water and dried it melts at 157°.

Calculated for $C_8H_8NO_2 \cdot C_7H_5O$: Carbon, 70.6%, Hydrogen, 5.1%, and Nitrogen, 5.5%. Found: Carbon, 70.4%, Hydrogen, 5.5%, and Nitrogen, 5.7%.

EXAMPLE 14

58 parts of 4-nitrosodiphenylamine are added to 110 parts of water and 290 parts of ethanol. 36 parts of sodium carbonate are added and the mixture is stirred rapidly at 25° C. 44 parts of benzoyl chloride are added dropwise during 30 minutes. During addition the mixture is cooled to prevent its temperature rising above 30°. Stirring is continued for 1½ hours. The precipitated benzoyl derivative is then collected, and washed with a little 70% aqueous ethanol and then thoroughly washed with water to remove sodium salts. The yield after drying is 82 parts (93% of theoretical) which melt at 154–156° C.

The product is obtained in the form of fine orange-yellow crystals and can easily be dispersed in rubber. A 10 g. sample when heated at a temperature rising by 2° C. per minute decomposes at a temperature above 143° C. This compound, when obtained by benzoylation under materially different conditions is slightly greener in shade, is not so easily dispersed in rubber, and similarly heated, decomposes exothermically at a temperature which may be as low as 107° C.

EXAMPLE 15

Rubber mixes are prepared by the procedure of Example 11 using the antioxidants listed below. The mixes are vulcanised for 20 minutes at 153° C. and the vulcanisates, in sheet form of 0.8 mm. thickness, are examined for antioxidant activity by determining the time taken, in hours, for an absorption of 1% of their weight of oxygen at 100° C. The results below show the antioxidants of the invention to lose little or none of their antioxidant effect after extraction as described in Example 10.

| Antioxidant | None | Product of example 5 | Product of example 12 |
| --- | --- | --- | --- |
| Percent on rubber hydrocarbon | | 2 | 2 |
| Time (in hours) for absorption of 1% oxygen: | | | |
| Unextracted vulcanisate | 9 | 15 | 31 |
| Extracted vulcanisate | <4 | 13 | 33 |

EXAMPLE 16

Rubber mixes are prepared by the procedure of Example 10 using the antioxidants listed below. The mixes are vulcanised for 20 minutes at 153° C. and the vulcanisates, in sheet form of 0.8 mm. thickness, are examined for antioxidant activity as described in Example 10. The results below show the antioxidants of invention to lose little of their antioxidant activity after extraction.

| Antioxidant | None | Lauric acid derivative of 4-nitrosodiphenylamine | Isobutyric acid derivative of 4-nitrosodiphenylamine | n-Hexanoic acid derivative of 4-nitrosodiphenylamine | n-Butyric acid derivative of 4-nitrosodiphenylamine |
| --- | --- | --- | --- | --- | --- |
| Percent on rubber hydrocarbon | | 2 | 2 | 2 | 2 |
| Time (in hours) for absorption of 2% oxygen: | | | | | |
| Unextracted vulcanisate | 18 | 36 | 39 | 38 | 41 |
| Extracted vulcanisate | <8 | 33 | 36 | 34 | 40 |

The acyl derivatives used above are prepared by reacting 4-nitrosodiphenylamine with lauryl chloride and isobutyric chloride respectively by the procedure of Example 6, and with n-hexanoic anhydride and n-butyric anhydride respectively by the procedure of Example 1.

EXAMPLE 17

Rubber mixes are prepared by the procedure of Example 10 but using the antioxidants listed below. The mixes are vulcanised for 20 minutes at 153° C. and the vulcanisates, in sheet form of 0.8 mm. thickness, are examined for antioxidant activity as described in Example 10. The results below show the antioxidants of invention to retain a high proportion of their antioxidant activity after extraction.

| Antioxidant | None | Product of example 13 | 3-Chloropropionyl derivative of 4-nitrosodiphenylamine | p-Chlorobenzoyl derivative of 4-nitrosodiphenylamine | Benzoyl derivative of 4-nitrosophenol | Benzoyl derivative of 4-nitroso-2-isopropyl-5-methyl phenol | Product of example 9 |
| --- | --- | --- | --- | --- | --- | --- | --- |
| Percent on rubber hydrocarbon | | 2 | 2 | 2 | 2 | 2 | 2 |
| Time (in hours) for absorption of 1% oxygen: | | | | | | | |
| Unextracted vulcanisate | 14 | 23 | 28 | 32 | 21 | 13 | 25 |
| Extracted vulcanisate | <4 | 9 | 24 | 22 | 18 | 8 | 30 |

We claim:

1. Stabilized rubber compositions wherein the rubber is natural or synthetic rubber comprising a polymer or copolymer of one or more diolefins containing in stabilizing amount an acyl compound which is an acyl derivative of a nitroso compound of the formula

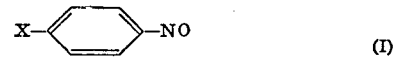

(I)

wherein X is a group of the formula NHR in which R is an alkyl, alkenyl, cycloalkyl, aryl, p-hydroxyphenyl or p-chlorophenyl group, the acyl group being derived from alkane carboxylic acids containing 4 to 18 carbon atoms, α,ω-alkane-dicarboxylic acids containing 6 to 12 carbon atoms, aryl mono- or di-carboxylic acids or alkyl, alkoxy or chloro derivatives thereof.

2. Stabilised rubber compositions as claimed in Claim 1 wherein X is a group NHR in which R is an aryl group.

3. Stabilised rubber compositions as claimed in Claim 1 wherein R is a phenyl group.

4. Stabilised rubber compositions as claimed in Claim 1 wherein the acyl group is a benzoyl group.

5. Stabilised rubber compositions as claimed in Claim 1 wherein the amount of acyl compound is from 0.1 to 4.0% of the weight of rubber.

6. Stabilised rubber compositions as claimed in Claim 1 wherein the amount of acyl compound is from 0.25 to 2.0% of the weight of rubber.

(References on following page)

References Cited

UNITED STATES PATENTS

| | | | |
|---|---|---|---|
| 2,895,937 | 7/1959 | Baldwin | 260—41.5 |
| 3,309,373 | 3/1967 | Danzig | 260—781 |
| 3,384,613 | 5/1968 | Parks | 260—45.9 R |

DONALD E. CZAJA, Primary Examiner

W. E. PARKER, Assistant Examiner

U.S. Cl. X.R.

260—41.5, 404, 557, 781

UNITED STATES PATENT OFFICE
CERTIFICATE OF CORRECTION

Patent No. 3,826,779                    Dated    July 30, 1974

Inventor(s) Brian Thomas Ashworth, Kenneth Crawford, and
            Peter Michael Quan It is certified that error appears in the above-identified patent and that said Letters Patent are hereby corrected as shown below:

Column 1, in the heading please insert the priority as follows:    --Claims priority, application Great Britain 5667/71 filed March 1, 1971--

Signed and sealed this 29th day of October 1974.

(SEAL)
Attest:

McCOY M. GIBSON JR.                    C. MARSHALL DANN
Attesting Officer                      Commissioner of Patents